N. S. SMITH.
Rotary Cultivator.
No. 21,377.
Patented Aug. 31, 1858.
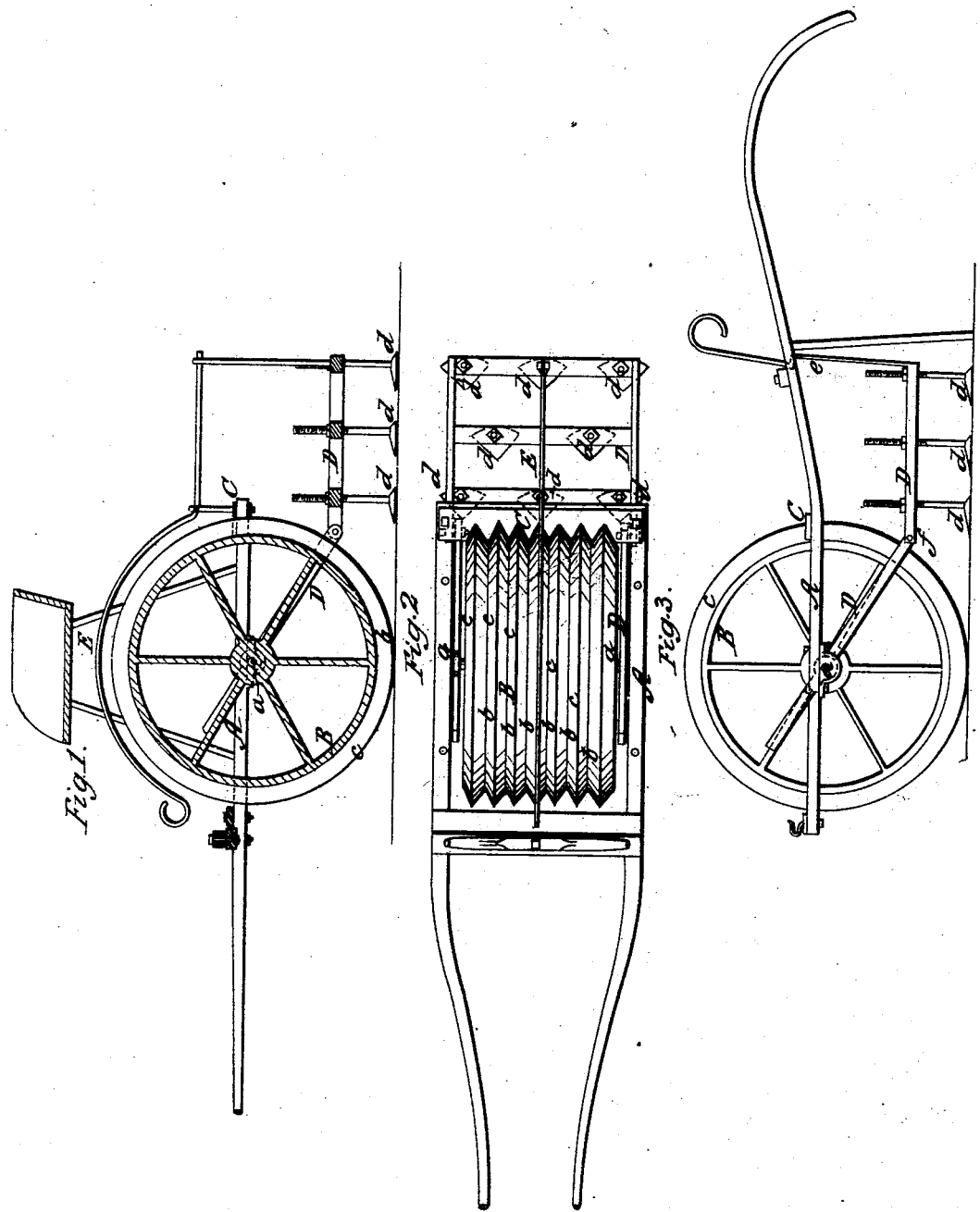

UNITED STATES PATENT OFFICE.

NATHL. S. SMITH, OF BUFFALO, NEW YORK.

IMPROVEMENT IN CULTIVATORS.

Specification forming part of Letters Patent No. 21,377, dated August 31, 1858.

*To all whom it may concern:*

Be it known that I, NATHANIEL S. SMITH, of Buffalo, in the county of Erie and State of New York, have invented a new and Improved Rotary Cultivator; and I do hereby declare that the following is a full, clear, and exact description of the same, reference being had to the accompanying drawings, forming part of this specification, in which—

Figure 1 is a vertical longitudinal section of my cultivator as arranged for use with horse in the field. Fig. 2 is a plan of the same, the driver's seat being removed. Fig. 3 is a side view of the cultivator as arranged for use by hand in the garden.

The nature of my invention consists in the method of attaching and operating by raising and lowering the gang-hoes to the cultivating-wheel B, the hoes being connected to the axle of the wheel by means of a double joint, $f a$, and raised and lowered by means of the lever E, which extends over the top of the wheel, and by lever D', which is also a joint-piece.

To enable others skilled in the art to make and use my invention, I will proceed to describe its construction and operation.

A represents the carriage-frame, having the driver's seat mounted upon it; and B, the propelling and cultivating wheel, made of cast-iron or other material, with two short journals, $a a$, on which the frame A rests, as represented, and with a series of V-shaped grooves, $b b$, in its periphery, and consequently a series of similar-shaped flanges or cutters, $c c$, on the same for cultivating the soil, as hereinafter stated. This wheel is generally made in one piece for garden use, but for field use may be made in two sections or otherwise, for better convenience for turning at the end of rows.

C is the toothed clearing bar or comb. It is arranged at the rear of the wheel on the carriage-frame in such position that the flanges or cutters of the same revolve between its teeth, and are cleared of dirt and other obstructions which may adhere to the wheel in its revolution.

D is the hoe-frame. It is also hung on the short journals of the wheel B, as shown, and is made capable of turning on said journals in order that it may be raised and lowered.

$d d$ are the hoes, made of any suitable construction and set so as to throw the soil reduced by the heavy grooved wheel either to or from the row of plants on each side of the space occupied by the wheel.

E is a lever connected to the hoe-frame and passing under the driver's seat, as shown. This lever serves for raising and lowering the hoe-frame, and accomplishes the raising of the hoes out of operative position by being depressed at its front end and the lowering of the same by being elevated at its front end, which is effected by the weight of the hoe-frame itself. The hoe-frame, after being elevated, may be held so by the foot or by a self-acting spring-catch, $e$, as shown in Fig. 3.

The construction of the attachment of the gang of hoes to the axle of the wheel B has some peculiar advantages. In the first place, the double joint gives the advantage of preserving horizontality to the gang of hoes in traveling over the surface, having all the advantages of the chain without its inconveniences. In the second place, the double joint admits of slightly raising the rear of the hoes, so that they shall merely pulverize the lumps of dirt on the surface without running to the depth of the usual furrow, and thus make these hoes do the work of the cultivator-harrow instead of the cultivator proper, when required. In the third place, the double-joint piece D' extends from the hoe-frame D to and beyond the axle $a$, where it is under control of the driver, who, when he finds the hoes approaching a low stone or other like obstruction, places his foot on the upper end of piece D' and raises the forward end of the frame and throws the hoes out of the ground.

Operation: For garden use the machine may be worked by hand, as represented in Fig. 3. It may occupy two persons, one in front to draw and one in rear to propel, an attachment of cord to the cross-bar at the front accompanying the person at draft; but one person alone can work the level garden without hard labor.

For field use the machine is to be worked by horse, as shown in Fig. 2. The grooved wheel, when in the garden, owing to being broad and heavy, and having V-shaped grooves and V-shaped or sharp flanges or cutters, as the machine moves forward confines and breaks the crusted soil, demolishes weeds, pulverizes lumps, and with the aid of hoes in the rear tills the soil admirably; and when in the field, by weight and momentum with the deep grooves and sharp flanges or cutters, the lumps, clods, and inverted turf are at once reduced to mold, and the mold at the same time is applied to the plant or not, at the pleasure of the operator.

This machine is very simple, compact, and durable, also very convenient of management and likewise perfect in its execution.

I do not claim the flanged or broad-cutting cylinder B, nor placing a gang of hoes behind such a cylinder, nor the combination of the comb-formed cleaner with such a cylinder; but

What I claim, and desire to secure by Patent, is—

The use of the double-joint piece D' to connect the gang of hoes to the axle when said joint-piece extends beyond the axle and subserves also the purpose of a foot-lever to throw the hoes out of the ground, in the manner and for the purpose set forth.

NATHANL. S. SMITH.

Witnesses:
C. A. WALDRON,
CON. A. WALDRON, Jr.